US012735580B2

(12) United States Patent
Iossifova et al.

(10) Patent No.: US 12,735,580 B2
(45) Date of Patent: Sep. 15, 2026

(54) ANTIMICROBIAL COATINGS

(71) Applicant: PPG Architectural Finishes, Inc., Pittsburgh, PA (US)

(72) Inventors: Aneta Bogdanova Iossifova, Allison Park, PA (US); Michael Andrew Zalich, Wexford, PA (US); Darin Wiley Laird, Pittsburgh, PA (US); Douglas G. Montjoy, Pittsburgh, PA (US); Juliet M. Pitcher, Fishers, IN (US); David N. Walters, Allison Park, PA (US); John Burgman, Wexford, PA (US); Justin Martin, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 749 days.

(21) Appl. No.: 18/040,845

(22) PCT Filed: Aug. 13, 2021

(86) PCT No.: PCT/US2021/045914
§ 371 (c)(1),
(2) Date: Feb. 7, 2023

(87) PCT Pub. No.: WO2022/036197
PCT Pub. Date: Feb. 17, 2022

(65) Prior Publication Data

US 2023/0295444 A1 Sep. 21, 2023

Related U.S. Application Data

(60) Provisional application No. 63/089,652, filed on Oct. 9, 2020, provisional application No. 63/065,719, filed on Aug. 14, 2020.

(51) Int. Cl.

| | |
|---|---|
| ***C09D 5/14*** | (2006.01) |
| ***A01N 59/20*** | (2006.01) |
| ***C09D 5/29*** | (2006.01) |
| ***C09D 7/20*** | (2018.01) |
| ***C09D 7/61*** | (2018.01) |
| ***C09D 7/63*** | (2018.01) |
| ***C09D 157/00*** | (2006.01) |
| ***C09D 187/00*** | (2006.01) |

(52) U.S. Cl.
CPC ............... *C09D 5/14* (2013.01); *A01N 59/20* (2013.01); *C09D 5/29* (2013.01); *C09D 7/20* (2018.01); *C09D 7/61* (2018.01); *C09D 7/63* (2018.01); *C09D 157/00* (2013.01); *C09D 187/00* (2013.01)

(58) Field of Classification Search
None
See application file for complete search history.

(56) References Cited

U.S. PATENT DOCUMENTS 5,110,620 A * 5/1992 Tani .................. B01D 39/1623 427/538
2021/0024756 A1* 1/2021 Clark ...................... C09D 7/61

FOREIGN PATENT DOCUMENTS

WO 2013025960 A1 2/2013
WO WO-2016209884 A1 * 12/2016 ............. A01N 59/24
WO WO-2017132302 A1 * 8/2017 ........... C03C 14/004
WO WO-2019178341 A1 * 9/2019 ............... C09D 5/14
WO 2021055300 A1 3/2021

OTHER PUBLICATIONS

International Search Report and Written Opinion received for PCT Application Serial No. PCT/US2021/045914 dated Jan. 3, 2022, 12 pages.
Office Action received for European Patent Application No. 21766750.0, mailed on May 30, 2025, 8 pages.

* cited by examiner

*Primary Examiner* — Peter A Salamon

(57) ABSTRACT

The present disclosure describes a coating composition comprising a film forming component, an effective amount of a copper containing glass particle and an effective amount of a color shift mitigating agent. Substrates coated therewith are also described.

28 Claims, No Drawings

ANTIMICROBIAL COATINGS

FIELD OF THE INVENTION

The present disclosure describes antimicrobial coatings and substrates coated therewith.

BACKGROUND OF THE INVENTION

Numerous disease causing microbes have the ability to survive for some period of time on substrates, including substrates that have been coated with a decorative and/or protective coating layer. Such substrates pose a health risk to humans who come in contact with the substrate. Coatings having the ability to kill microbes on a continuous basis are therefore desired.

SUMMARY OF THE INVENTION

The present disclosure describes a coating composition comprising a film forming component, an effective amount of a copper containing glass particle, and an effective amount of a color shift mitigating agent.

DETAILED DESCRIPTION OF THE INVENTION

The present disclosure describes a coating composition comprising a film forming component, an effective amount of a copper containing glass particle, and an effective amount of a color shift mitigating agent. Color shift mitigating agent(s) may be referred to herein as "agent(s)". The composition may further comprise a carrier. The present coating compositions may be antimicrobial. "Antimicrobial" means that the coating compositions have protection against at least one species of microbe, such as at least one type of fungi, bacteria, or virus, including such protection against any combination thereof. Coating layers deposited from such coating compositions also have such protection. "Protection" in this context means the coating composition and/or coating layer deposited therefrom kill or inhibit the growth of such microbes; this protection is imparted, at least in part, from the copper containing glass particles.

The compositions as described herein comprise a film-forming component. "Film-forming" means that the composition, upon drying, coalescing and/or curing, can form a self-supporting continuous film on a surface of a substrate upon removal of any diluents or carriers in the composition upon drying, curing or coalescing at ambient or elevated temperature. A film-forming component may include, for example, a film-forming resin and a crosslinker therefor. "Film forming component" can therefore collectively refer to a resin and a crosslinker reactive with the resin. The film-forming component can be thermoset or thermoplastic. Any film-forming resin can be used according to the present invention including, but not limited to, an epoxy resin, an acrylic resin, a polysiloxane resin, a polyurethane resin, a polyurea resin, a polyvinyl resin, a phenolic resin, a urea-formaldehyde resin, a polyimide resin, a melamine resin, a polyester resin and a cyanate resin; one skilled in the art will be able to choose a suitable crosslinker based upon the reactivity of the resin. Such a resin can react with itself, that is, undergo a self-crosslinking reaction, or can react with a crosslinker to form a film. Such reactions may occur at ambient or elevated temperature. "Ambient" refers to room temperature, typically 20° C.+/−5° C. "Coalesce" and like terms refers to the process by which a coating composition hardens to form a coating. "Coalescing" and like terms may include the coating composition being cured (that is, hardening by being crosslinked, either by itself or via a crosslinking agent) or the coating composition being dried. "Coalesce", "cure", "dry" and variants thereof may be used interchangeably herein to refer to a layer that has been deposited from the coating compositions described herein and become hardened. Particularly suitable are those film-forming resins that self-crosslink or undergo cure or coalescence at ambient conditions. Examples of film-forming resins that undergo coalescence at ambient conditions include an acrylic emulsion, a vinyl acetate-ethylene copolymer emulsion, a vinyl acetate-acrylic copolymer emulsion, a styrene acrylic emulsion, a vinyl acetate-vinyl versatate copolymer emulsion and the like. Combinations of any of these emulsions can also be used.

The compositions described herein comprise an effective amount of copper containing glass particles. Suitable copper containing glass particles include those described in WO 2017/132302 A1, incorporated by reference herein in pertinent part, such as paragraphs 22-70. Suitable copper containing glass particles may have a total amount of copper by wt % in the particle of 10 to 30, such as 15 to 25, or 11 to 30, or 20 to 30, or 26+/−3 wt %, based on total weight of the particle. The copper in the particles may be in the form of CuO, and have a wt % of CuO in the particle ranging from 30 to 36, which corresponds with a copper content of 24 to 28.8 wt % copper based on the weight of the particle. $Cu^{+1}$ or copper (1) ions, which have particularly effective antimicrobial activity, may be released from the copper containing glass particles over time when incorporated into the coating compositions of the present invention. This release of copper ions may impart to the coating composition and/or coating layer deposited therefrom a continuous antimicrobial effect, although the inventors do not wish to be bound by this. Copper containing glass particles are commercially available as GUARDIANT particles from Corning Incorporated, Corning, New York. As used in reference to the copper containing glass particles, "effective amount" refers to that amount of copper containing glass particles that impart to the coating composition the desired level of antimicrobial activity. Antimicrobial activity can be measured, for example, by the Japanese Industrial Standard JIS Z 2801. The desired level of antimicrobial activity may vary based upon the needs of the user and may also vary if additional antimicrobial agents are used in the composition. That is, if one or more additional antimicrobial agents is used, the amount of copper containing glass particles may be reduced. A typical amount of copper containing glass particles comprising 26 wt %+/−3 wt % copper based on the weight of the particle may be up to 150 grams per gallon; however, lower concentrations, such as 40 grams per gallon can be used. For example, the coating compositions described herein can comprise 40 grams of copper containing glass particle per gallon of coating composition or greater, such as 50 or greater, 60 or greater, 70 or greater, 80 or greater, 85 or greater, or 40 to 85, such as 50-75, or 45-55, or 70-90 or 75-85. Higher or lower effective amounts of copper containing glass particle may also be used depending on the other composition components. It will be appreciated that when copper containing glass particles are used, the effective amounts given above reflect the weight of the total particle and not the weight of the copper in the copper containing glass particle. An effective amount of copper containing glass particle comprising 26 wt %+/−3 wt % copper based on the weight of the particle can be 0.90 to 4.0 wt %, such as 1.5 to 3.8 wt % or 1.9 to 3.4 wt %, based on total solids of the composition. The copper containing glass particle may impart antimicrobial activity to the coating composition and/or to the coalesced coating layer deposited from such a composition.

It will be appreciated that copper has a distinctive color, and when included in a coating composition may cause the color of that composition to change. Moreover, as copper ions release over time, the color of the coating composition may continue to change. Such color change is referred to herein as "color shift". Color shift can occur in a coating composition comprising the copper containing glass particles and/or in a coating layer that is formed from such a coating composition. The coating compositions described herein (and therefore the coating layers deposited therefrom) include a color shift mitigating agent.

An effective amount of color shift mitigating agent may be used. Suitable color shift mitigating agents include any compound that causes a decrease in the color shift observed in an uncoalesced or wet coating composition and/or the color shift observed in a coalesced or dried coating layer. Whether there is a decrease in the color shift can be determined, for example, through measurement using the CIE L*a*b* system, where C* equals the square root of $a^{*2}+b^{*2}$. L*, a* and b* can be measured using a spectrophotometer, such as a Datacolor 600, Datacolor 800 or the like. Color shift can be determined by measuring the difference between initial L*, a* and b* values ($L^*_1$, $a^*_1$, $b^*_1$) upon the addition of copper containing glass particles to coating compositions, or upon application of such compositions to a substrate, and then measuring the same values at any time thereafter ($L^*_2$, $a^*_2$, $b^*_2$) to calculate delta values for each measurement. The difference in color or "Delta E" reflects the color shift the coating composition or coating layer has undergone. Delta E can be calculated using the following equation:

$$\Delta E^* = \sqrt{(L_2^* - L_1^*)^2 + (a_2^* - a_1^*)^2 + (b_2^* - b_1^*)^2}.$$

The Delta E of a first coating composition comprising the copper containing glass particles and without a color shift mitigating agent can be compared to a second composition that is the same as the first but comprising such an agent. If the Delta E of the second coating composition (comprising the color shift mitigating agent) is less than the Delta E of the first coating composition (lacking the agent), the agent is a "color shift mitigating agent" according to the present invention. An original color measurement of each composition can be made, for example, when the copper containing glass particles are added to the coating composition or any time thereafter, and the change in color (Delta E) measured any time after the original measurement. A color shift mitigating agent can result in any decrease in Delta E as compared to a composition lacking such an agent, such as a decrease of 5% or greater or a decrease of 10% or greater.

As noted above, the copper containing glass particles impart antimicrobial properties to the coating composition and/or the cured coating layer deposited therefrom. Certain agents, in addition to providing color shift mitigation, may increase the antimicrobial efficacy of the copper containing glass particles and/or impart additional antimicrobial activity to the coating composition and/or cured or coalesced coating layer deposited therefrom. That is, certain agents may result in measurable reduction in viable microbes, measured, for example, as described above.

Suitable color shift mitigating agents may include, for example, sulfite generating compounds, citrate generating compounds, benzoate generating compounds, L-ascorbic acid, isoascorbic acid, substituted or unsubstituted triazoles, such as 1,2,4-triazole, substituted or unsubstituted benzotriazole and stearic acid. Other examples include a propionic acid, such as mercaptopropionic acid, sodium pyruvate, butylated hydroxytoluene, imidazole, substituted imidazoles, benzimidazole, and substituted benzimidazoles. Other examples include (2-pyrrole carbonyl) benzotriazole; (2-thienyl carbonyl)-benzotriazole; amino-1,2,4-triazole; methyl-6-oxo-4,5,6,7-tetrahydro-2H-pyrazolo[3,4-b]pyridine-5-carbonitrile; methyl-6-oxo-4-(3-phenoxyphenyl)-4,5,6,7-tetrahydro-2H-pyrazolo[3,4-b]pyridine-5-carbonitrile; methyl-6-oxo-4-(thiophen-2-yl)-4,5,6,7-tetrahydro-2H-pyrazolo[3,4-b]pyridine-5-carbonitrile; diamino-1,2,4-triazole; mercapto-1H-1,2,4-triazole; methyl-2-phenyl-imidazole; octylphenol; amino-3-hydrazino-5-mercapto-1,2,4-triazole; phenyl-1-H-tetrazole; amikacin disulfate; argan oil; anisaldehyde-[5-(p-methyl)-phenyl-4-amino-(1,2,4-triazolyl)-2-thiol]-acyldrazone; adhatoda vasica; N-benzyl-1H-benzotriazole-1-carbothioamide; benzimidazole; benzothiazole; benzotriazole; csiliqua, ceratonia siliqua; calligonum comosum; capparis decidua seeds; cysteine; mercaptobenzimidazole; mercaptobenzothiazol; methyl 3-((2-mercaptophenyl)imino)butanoate; sodium carboxymethyl cellulose; N-(furan-2-ylmethylidene)-4-({4[E)-(furan-2-ylmethylidene) amino]phenyl}ethyl) aniline, N-(2-thiazolyl)-1H-benzotriazole-1-carbothioamide; vanillin-[5-(p-methyl)-phenyl-4-amino-(1,2,4-triazolyl)-2-thiol]-acylhydrazone; mercaptobenzoxazole; (2H-benzotriazol-2-yl)-4-methylphenol; phenol, 2-(2H-benzotriazol-2-yl)-6-dodecyl-4-methyl-; 2-(2'-hydroxy-3',5'-di-tert-amylphenyl)benzotriazole; 1H-benzotriazole, 4(or 5)-methyl-, sodium salt; 2-(2H-Benzotriazol-2-yl)-4,6-di-tert-pentylphenol; 1,2,3-benzotriazole; 2-(2-hydroxy-5-tert-octylphenyl)benzotriazole; 2-(2-hydroxy-5-tert-octylphenyl)benzotriazole; 6-chloro-5-[(3,5-dimethylisoxazol-4-yl)sulfonyl]-2,2-difluoro-5H-[1,3]dioxolo[4,5-f]benzimidazole; Tetrahydroimidazo[4,5-d]imidazole-2,5-dione; disodium 3-(2-(2-carboxyethoxy)ethyl)-2-heptyl-2,3-dihydro-1H-imidazole-1-propanoate; 1H-benzimidazolesulfonic acid, 2-(7-(diethylamino)-2-oxo-2H-1-benzopyran-3-yl)-, monosodium salt; 1H-imidazole-dipropanoic acid, 4,5-dihydro-1-(2-hydroxyethyl)-2-norcoco alkyl derivatives, di-me esters, phosphates (esters), sodium salts; 2-propenoic acid, 2-methyl-, 2-hydroxyethyl ester, polymer with 1-ethenyl-1H-imidazole, ethenylmethylbenzene, isooctyl 2-propenoate and alpha-(2-methyl-1-oxo-2-propenyl)-omega-methoxypoly(oxy-1,2-ethanediyl), tert-butyl 2-ethylhexaneperoxoate-initiated; -methoxypolyethyleneglycol methacrylate polymer with 2-ethylhexylacrylate, 2-hydroxyethyl methacrylate, tert-butylperoxy-2-ethylhexanoate, vinylimidazole, vinyltoluene polymer; 1H-Imidazole, 1-ethenyl-, polymer with alpha-(2-methyl-1-oxo-2-propen-1-yl)-omega-methoxypoly(oxy-1,2-ethanediyl), 4,4'-(1,2-diazenediyl)bis[4-cyanopentanoic acid]-initiated; imidazo[4,5-d]imidazole-2,5(1H,3H)-dione, tetrahydro-1,3,4,6-tetrakis(methoxymethyl)-polymer with ω-hydro-ω-hydroxypoly(oxy-1,2-ethanediyl), reaction products with polyethylene glycol mono(dodecylphenyl) ether and polyethylene glycol mono(tris(1-phenylethyl)-phenyl) ether. A "sulfite generating compound" is one that, when added to water, will generate $SO_3^{2-}$; suitable examples include sodium metabisulfite, sodium sulfite, sodium bisulfite, potassium metabisulfite, potassium sulfite, potassium bisulfite, calcium sulfite, calcium bisulfite, and sulfur dioxide. A "citrate generating compound" is one that generates citrate trianion, the salts thereof and/or the esters thereof; suitable examples include citric acid in any form such as citric acid monohydrate, salts thereof such as sodium citrate in any form such as sodium citrate dihydrate, monosodium citrate, disodium citrate or trisodium citrate, potassium citrate in any form, and esters thereof such as triethyl citrate. A "benzoate generating compound" is one that generates benzoate anion; suitable examples include sodium benzoate, potassium benzoate, and calcium benzoate.

Use of a color shift mitigating agent having a particular solubility in the coating composition may be desired. While not wishing to be bound, the inventors believe that color shift occurs through the leaching of copper (I) from the copper containing glass particle and the subsequent oxidation of copper (I) to copper (II) over time and/or the chelation of certain species in the coating composition with the copper (I) and/or the copper (II) ions. In order for a color shift mitigating agent to be effective, either by preventing or mitigating the oxidation of copper (I) to copper (II) (either by interaction directly with a copper ion or by oxygen scavenging to suppress the oxidation process) and/or the chelating copper (I) or copper (II) ions, the agent should be able to interact intimately with different species in the coating composition and hence, a certain degree of solubility in the coating composition may be desired.

Certain color shift mitigating agents may be particularly suitable for in-can color shift mitigation (that is, the uncoalesced coating composition) while others may be particularly suitable for coating layer color shift mitigation (that is, the coalesced coating layer deposited from the present compositions). Sodium metabisulfite, sodium citrate, sodium bisulfite, L-ascorbic acid, and iso-ascorbic acid are particularly suitable for in can color shift mitigation, and 1,2,4-triazole, citric acid, sodium citrate, and benzotriazole for both in can color shift mitigation and coating layer color shift mitigation. Combinations of color shift mitigating agents might be particularly suitable to provide mitigation of color shift in both the wet state and dry film state.

"Effective amount" when used in reference to a color shift mitigating agent refers to that amount that results in the desired level of color mitigation. The copper containing glass particle concentration may be relevant in determining the effective amount. An effective amount of agent may range from 0.02 to 3.0 wt %, such as 0.07 to 2.6 wt % with wt % based on total solids of the composition in a composition where the ratio of copper containing glass particle to agent is 40:1 to 0.5:1, such as 30:1 to 0.5:1 or 28.6:1 to 0.7:1. These amounts are based on a copper containing glass particle having a copper content of 26 wt %+/−3 wt % based on total weight of the particle and may be higher or lower, particularly depending on the amount of copper containing glass particle used or if the wt % of copper in the particle is higher than 29 or lower than 23, or they may stay the same regardless of the copper containing glass particle concentration or wt % of copper in the particle.

The coating compositions described herein may specifically exclude non copper pyrithione salts, such as zinc pyrithione, and/or sodium thiocyanate, and/or TiO, and/or 4-bromo-2-(4-chlorophenyl)-5-(trifluoromethyl)-1HH30-pyrrole-3-carbonitrile (tralopyril), and/or quaternary ammonium compounds, and/or EDTA and/or thiourea.

A specific coating composition comprises a) a film forming component; b) an effective amount of copper containing glass particle; and c) an effective amount of a sulfite generating compound, such as sodium bisulfite and/or sodium meta bisulfite, wherein when the effective amount of copper containing glass particle comprising 26 wt %+/−3 wt % copper based on the weight of the particle is 0.90 to 4.0 wt % such as 1.5 to 3.8 wt % or 1.9 to 3.4 wt %, and the effective amount of sodium (meta) bisulfite is 0.15 to 1.50%, or 0.19 to 1.41%, with wt % based on total solids of the composition. The film forming component of such a composition could comprise an alkyd and/or an acrylic emulsion, and the composition could be aqueous based.

A specific coating composition comprises a) a film forming component; b) an effective amount of copper containing glass particle; and c) an effective amount of citrate generating compound, such as sodium citrate and/or citric acid, wherein when the effective amount of copper containing glass particle comprising 26 wt %+/−3 wt % copper based on the weight of the particle is 0.90 to 4.0 wt %, such as 1.5 to 3.8 wt % or 1.9 to 3.4 wt %, and the effective amount of citric acid, such as in the form of citric acid monohydrate, is 0.1 to 1.2 wt % or 0.2 to 1.0 wt % and/or sodium citrate is 0.5 to 3.0 wt % or 0.7 to 2.6 wt %, based on total solids of the composition. The film forming component of such a composition could comprise an acrylic emulsion and the composition could be aqueous based, or the film forming composition could comprise a polyurethane and the composition could be solvent based.

A specific coating composition comprises a) a film forming component; b) an effective amount of copper containing glass particle; and c) an effective amount of ascorbic acid, such as L-ascorbic acid in an amount of 0.1 to 1.0 wt % or 0.2 to 0.9 wt % or such as iso-ascorbic acid in an amount of 0.90 to 1.5 wt % or 0.2 to 1.4 wt %, and wherein the effective amount of copper containing glass particle comprising 26 wt %+/−3 wt % copper based on the weight of the particle is 0.90 to 4.0 wt %, such as 1.5 to 3.8 wt % or 1.9 to 3.4 wt %, based on total solids of the composition. The film forming component of such a composition could comprise an acrylic emulsion and the composition could be aqueous based.

A specific coating composition comprises a) a film forming component; b) an effective amount of copper containing glass particle; and c) an effective amount of triazole, such as 1,2,4-triazole, wherein the effective amount of 1,2,4-triazole is 0.02 to 0.35 wt % or 0.07 to 0.29 wt % and wherein the effective amount of copper containing glass particle comprising 26 wt %+/−3 wt % copper based on the weight of the particle is 0.90 to 4.0 wt %, such as 1.5 to 3.8 wt % or 1.9 to 3.4 wt %, with wt % based on total solids of the composition. The film forming component of such a composition could comprise an acrylic emulsion and the composition could be aqueous based.

A specific coating composition comprises a) a film forming component; b) an effective amount of copper containing glass particle; and c) an effective amount of stearic acid, wherein the effective amount of stearic acid is 0.5 to 1.5 wt % such 0.90 to 1.4 wt % or 1.2 wt %, and wherein the effective amount of copper containing glass particle comprising 26 wt %+/−3 wt % copper based on the weight of the particle is 0.90 to 4.0 wt %, such as 1.5 to 3.8 wt % or 1.9 to 3.4 wt %, with wt % based on total solids of the composition. The film forming component of such a composition could comprise a polyurethane and the composition could be solvent based.

A specific coating composition comprises a) a film forming component; b) an effective amount of copper containing glass particle; and c) an effective amount of a benzoate generating compound, such as sodium benzoate, wherein the effective amount of sodium benzoate is 0.5 to 1.0 wt %, such as 0.7 wt %, and wherein the effective amount of copper containing glass particle comprising 26 wt %+/−3 wt % copper based on the weight of the particle is 0.90 to 4.0 wt %, such as 1.5 to 3.8 wt % or 1.9 to 3.4 wt %, with wt % based on total solids of the composition. The film forming component of such a composition could comprise an acrylic emulsion and the coating composition could be aqueous based.

The coating compositions described herein can be formulated so as to contain a ratio of copper containing glass particle to color shift mitigating agent of 40:1 to 0.5 to 1, such as 30:1 to 0.5 to 1, wherein the amount of copper containing glass particle comprises 26 wt %+/−3 wt % copper based on total weight of the particle.

The coating compositions described herein may contain any additional components, including those typically used in such compositions. As discussed above, the coating compositions may comprise one or more antimicrobial agents in addition to the copper containing glass particles. An "antimicrobial agent" is a compound that provides protection in addition to that provided by the copper containing glass particle, and against at least one species of microbe, such as at least one type of fungi, bacteria, or virus, including protection against any combination thereof. Suitable antimicrobial agents for use in the present compositions include, for example, dichloro-octylisothiazolinone fungicide/mildewcide (commercially available from DuPont as ROZONE 2000), 3-iodo-2-propynyl butyl carbamate fungicide (commercially available from Thor as ACTICIDE IPW 40, from Troy as POLYPHASE AF3, POLYPHASE P20TFUNGITROL 940, FUNGITROL 920, POLYPHASE PW20, POLYPHASE PW40), zinc pyrithione antimicrobial (commercially available from Lonza as ZINC OMADINE ZOEAntimicrobial and from Janssen as ZINC-PYRION), dibromodicyanobutane (commercially available from Lanxess as TEKTAMER 38 and from DuPont as BIO-CHECK 430), poly(hexamethylene biguanide) hydrochloride (commercially available from Lonza as VANTOCIL 1B), barium metaborate (commercially available from Buckman as BUSAN 11-M1 or 11-M2), 1,2-benzisothiazolin-3-one (commercially available from Troy as MERGAL K10N, from Lonza as PROXEL BD-20 or PROXEL GXL, or from DuPont as ROCIMA BT NV2), a mixture of 5-chloro-2-methyl-2H-isothiazol-3-one and 1,2-benzisothiazolin-3-one/2-methyl-3-isothiazolone (commercially available from Lonza as PROXEL BC), 2-methyl-4-isothiazolin-3-one/1,2-benzisothiazolin-3-one biocide (commercially available from Thor as ACTICIDE MBS), 1,2-benzisothiazolin-3-one/2,2',2"-(hexahydro-1,3,5-triazine-1,3,5-triyl) triethanol (commercially available from Lonza as PROXEL TN), 2-bromo-2-nitro-1,3-propanediol (commercially available from DuPont as BIOBAN BP-plus), 2-bromo-2-nitro-1,3-propanediol/1,2-benzisothiazolin-3-one/2-methylisothiazolin-3-one (commercially available from Thor as ACTICIDE MBL), 2-bromo-2-nitro-1,3-propanediol/2-methylisothiazolin-3-one/5-chloro-2-methyl-2H-isothiazolin-3-one (commercially available from Thor as ACTICIDE GA), N-(trichloromethylthio)phthalimide (commercially available from Troy as FUNGITROL 11 or FUNGITROL 11-50S), chlorothalonil (commercially available from Troy as FUNGITROL 404DS or from Thor as ACTICIDE C40), 5-chloro-2-methyl-4-isothiazolin-3-one/2-methyl-4-isothiazolin-3-one (commercially available from Troy as MERGAL K9N, from DuPont as KATHON LX 1.5, or from Thor as ACTICIDE RS or ACTICIDE MV), 2,2-dibromo-3-nitrilopropionamide (commercially available from DuPont as DOWICIL QK-20), 3,4,4-trimethyl-oxazolidine/4,4-dimethyl-oxazolidine (commercially available from Troy as MERGAL 186 and from Lonza as NUOSEPT 101), methyl-4-isothiazolin-3-one (commercially available from DuPont as ROCIMA 550 and from Thor as ACTICIDE M10S or ACTICIDE M20S), 2-octyl-2H-isothiazol-3-one (commercially available from Thor as ACTICIDE OTW45 or ACTICIDE OTW and from DuPont as SKANE M-8), 1H,3H,5H-oxazolo[3,4-c]oxazole-7a(7H)-methanol/(1H,3H,5H-oxazolo[3,4-c]oxazol-7a(7H)-ylmethoxy)-methanol/5-hydroxypoly(methyleneoxy (75% C2, 21% C3, 4% C4, 1% C5)methyl-1-aza-3,7-dioxabicyclo-(3.3.0)octane (commercially available from Troy as NUOSEPT 95), sodium pyrithione (commercially available from Lonza and SODIUM OMADINE), and 2-(4-thiazolyl)benzimidazole (commercially available from Lanxess as METASOL TK-100).

Other suitable additives for use in the compositions include, for example, plasticizers, abrasion-resistant particles, film-strengthening particles, flow control agents, thixotropic agents, rheology modifiers, cellulose acetate butyrate, catalysts, antioxidants, coalescing agents, initiators, accelerators, reinforcing materials, defoamers, surfactants, wetting agents, dispersing aids, corrosion inhibitors, adhesion promoters, clays, hindered amine light stabilizers, UV light absorbers and stabilizers, stabilizing agents, fillers, organic cosolvents, reactive diluents, grind vehicles, and other customary auxiliaries, or combinations thereof. The coating compositions may also include colorants, including pigments and/or dyes, that may impart a desired color to the coating composition and the resulting coating layer. Alternatively, the present coating compositions can be unpigmented; that is, a clear coat. A clear coat can be tinted or untinted.

It will be appreciated that the coating compositions described herein may have a desired pH range and that rheology of the composition may be affected by pH. It will further be appreciated that addition of any of the color shift mitigating agents described herein may cause the pH of the composition to change. Accordingly, the compositions may further comprise a compound to adjust pH to a desired range. For example, an architectural coating composition may desirably have a pH of 7 to 9, such as 8. An acidic color shift mitigating agent may cause the pH to fall below the desired range. Any suitable alkaline compound could be added to bring the pH into the desired range; suitable in the context of a pH modifying compound refers to a compound that allows for pH adjustment without having a significant negative affect on the composition.

The coating compositions described herein may comprise water as a carrier. As such the compositions may be aqueous. "Aqueous", "aqueous based" or "water borne" as used herein refers to a medium or carrier that is 50 wt % or greater water, with wt % based on the total weight of the carrier. An aqueous composition does not necessarily exclude the presence of some organic solvent, such as in an amount of less than 50 wt % based on the total weight percent of the carrier. Alternatively, the coating compositions may contain 50 wt % or greater of organic solvent, with wt % based on the total weight of the carrier. Such compositions may be referred to herein as "solvent based" or "solvent borne".

Formulation of the coating composition involves the process of selecting and admixing appropriate coating ingredients in the correct proportions to provide a coating composition with the desired processing and handling properties, as well as a final dry coating layer or film with the desired properties. The coating composition may be formulated to have a viscosity such that it can be used as a caulk or sealant. The coating composition may also be formulated to be capable of electrodeposition (i.e. an "electrocoat" or "ecoat"). The coating compositions may be applied by conventional application methods such as, for example, electrocoating, dipping, brushing, wiping, roller application, and spraying methods such as, for example, air-atomized spray, air-assisted spray, airless spray, high volume low pressure spray, and air-assisted airless spray.

The substrate may comprise or be a bare surface, a cleaned surface, pretreated with one or more pretreatment compositions, further prepared by sanding or other conventional preparation processes, and/or coated with one or more primary film-forming compositions such as electrocoats, primers, surfacers, topcoats including pigmented basecoats, prior to application of the coating composition.

Suitable substrates over which the coating compositions may be applied include, but are not limited to, metallic or non-metallic substrates including: ferrous metal, aluminum, aluminum alloys, copper, and any alloys thereof such as iron, steel, and alloys thereof, including cold rolled steel, galvanized (zinc coated) steel, electrogalvanized steel, stainless steel, pickled steel, zinc-iron alloy such as GALVANNEAL, and combinations thereof, concrete, stucco, cement board, MDF (medium density fiberboard) and particle board, gypsum board, wood, stone, plastics including vinyl textile, plaster, fiberglass, ceramic, etc., which may be pre-primed by waterborne or solvent borne primers. For example, such substrates can be used in architectural applications such as an interior wall or other interior surface such as a floor, carpet, cabinet, or shelf, a door handle or knob, door trim, banister, railing, light switch and the like. of a building or residence. The architectural substrate may be an outdoor substrate exposed to outdoor conditions. The architectural substrate may be smooth or textured.

The coating compositions can be applied to substrates used in other industries, such as those used in the automotive industry, the marine industry, other industrial substrates, heavy-duty equipment, packaging, furniture, fabric, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like.

The substrate can be part of a structure or part of a vehicle. “Structure” as used herein refers to a any part of a building, bridge, transportation infrastructure, oil rig, oil platform, water tower, power line tower, support structures, wind turbines, walls, piers, docks, levees, dams, shipping containers, trailers, and any metal structure that is exposed to a corrosive environment. “Vehicle” as used herein refers to in its broadest sense all types of vehicles, such as but not limited to cars, trucks, buses, tractors, harvesters, heavy duty equipment, vans, golf carts, motorcycles, bicycles, railcars, subway cars, airplanes, helicopters, boats of all sizes and the like.

When applied to a substrate and coalesced to form a coating layer thereon, the coating layer may have antimicrobial efficacy.

As used herein, unless otherwise expressly specified, all numbers such as those expressing values, ranges, amounts or percentages may be read as if prefaced by the word “about”, even if the term does not expressly appear. Also, any numerical range recited herein is intended to include all sub-ranges subsumed therein. Singular encompasses plural and vice versa. For example, although reference is made herein to “a” color shift mitigating agent, “an” agent”, “a” film forming component, “a” copper containing glass particle, and the like, one or more of each of these and any other components can be used. As used herein, the term “polymer” refers to oligomers and both homopolymers and copolymers, and the prefix “poly” refers to two or more. Including, for example and like terms means including for example but not limited to. When ranges are given, any endpoints of those ranges and/or numbers within those ranges can be combined within the scope of the present invention.

EXAMPLES

The following examples are intended to illustrate the invention and should not be construed as limiting the invention in any way.

Example 1

Coating compositions were prepared according to the formulations shown in Tables 1 and 2 using commercially available PPG DIAMOND brand paint. The copper containing glass particle was added stepwise to PPG DIAMOND Eggshell under stirring with a conventional stirring blade for 5 minutes. The paints were stirred further for 10 minutes and then mixed on a shaker for 15 minutes. L-ascorbic acid, iso-ascorbic acid, 1,2,4-triazole or sodium metabisulfite, as indicated in Tables 1 and 2, were then added as 10% solutions in water under stirring.

TABLE 1

PPG DIAMOND Formulations with Ascorbic Acids.

| Formulations Item | 1-A | 1-B | 1-C | 1-D | 1-E | 1-F | 1-G | 1-H |
|---|---|---|---|---|---|---|---|---|
| | Amount (g) | | | | | | | |
| PPG DIAMOND Eggshell | 99.0 | 99.0 | 99.0 | 99.0 | 99.0 | 99.0 | 99.0 | 99.0 |
| Copper containing glass particle[1] | 1.0 | 1.0 | 1.0 | 1.0 | 1.0 | 1.0 | 1.0 | 1.0 |
| L-ascorbic Acid[2], 10% in water | | 1.0 | 2.5 | 5.0 | | | | |
| iso-ascorbic acid[2], 10% in water | | | | | 1.0 | 2.5 | 5.0 | 7.5 |
| Total Weight (g) | 100.0 | 101.0 | 102.5 | 105.0 | 101.0 | 102.5 | 105.0 | 107.5 |
| Total Solids (g) | 52.5 | 52.6 | 52.7 | 53.0 | 52.6 | 52.7 | 53.0 | 53.2 |
| % Copper containing glass particle[1] on total solids | 1.9 | 1.9 | 1.9 | 1.9 | 1.9 | 1.9 | 1.9 | 1.9 |
| % Agent on total solids | 0 | 0.2 | 0.5 | 0.9 | 0.2 | 0.5 | 0.9 | 1.4 |
| Ratio of copper containing glass particle[1] to agent | — | 10.0 | 4.0 | 2.0 | 10.0 | 4.0 | 2.0 | 1.3 |

[1]GUARDIANT particles from Corning

[2]Available from Merck KGaA (Darmstadt, Germany)

TABLE 2

PPG Diamond Formulations with Triazole or Sodium Metabisulfite.

| Formulations Item | 1-A | 1-I | 1-J | 1-K | 1-L Amount (g) | 1-M | 1-N | 1-O | 1-P |
|---|---|---|---|---|---|---|---|---|---|
| PPG DIAMOND Eggshell | 99.0 | 99.0 | 99.0 | 99.0 | 99.0 | 99.0 | 99.0 | 99.0 | 99.0 |
| Copper containing glass particle[1] | 1.0 | 1.0 | 1.0 | 1.0 | 1.0 | 1.0 | 1.0 | 1.0 | 1.0 |
| 1,2,4- triazole[2], 10% in water | | 0.4 | 0.5 | 1.0 | 1.5 | | | | |
| Sodium metabisulfite[2], 10% in water | | | | | | 1.0 | 2.5 | 5.0 | 7.5 |
| Total Weight (g) | 100.0 | 100.4 | 100.5 | 101.0 | 101.5 | 101.0 | 102.5 | 105.0 | 107.5 |
| Total Solids (g) | 52.5 | 52.5 | 52.5 | 52.6 | 52.6 | 52.6 | 52.7 | 53.0 | 53.2 |
| % Copper containing glass particle[1] on total solids | 1.9 | 1.9 | 1.9 | 1.9 | 1.9 | 1.9 | 1.9 | 1.9 | 1.9 |
| % Agent on total solids | 0 | 0.07 | 0.10 | 0.19 | 0.29 | 0.19 | 0.47 | 0.94 | 1.41 |
| Ratio of copper containing glass particle[1] to agent | — | 28.6 | 20.0 | 10.0 | 6.7 | 10.0 | 4.0 | 2.0 | 1.3 |

[1]GUARDIANT particles from Corning
[2]Available from Merck KGaA (Darmstadt, Germany)

The in-can color change of the coating compositions was determined by measuring the initial color of the coatings one day after application via drawdown on Leneta paper and then measuring the color of a new drawdown after the coatings had aged in the cans for 28 days. The coatings were stored in lined cans at room temperature. As shown in Table 3, all formulations except 1-J demonstrated lower color shift (Delta E) over a period of 28 days as compared to control formulation 1-A, which contained no agent.

TABLE 3

PPG DIAMOND In-Can Color Changes in 28 Days at Ambient Temperature.

| Formulations | 1-A | 1-B | 1-C | 1-D | 1-E | 1-F | 1-G | 1-H | 1-I | 1-J | 1-K | 1-L | 1-M | 1-N | 1-O | 1-P |
|---|---|---|---|---|---|---|---|---|---|---|---|---|---|---|---|---|
| Delta E | 3.40 | 1.52 | 2.28 | 2.56 | 1.78 | 1.60 | 2.10 | 2.28 | 2.96 | 3.70 | 0.50 | 0.58 | 2.82 | 1.43 | 1.78 | 3.25 |

The dry film color change of the coating compositions was determined by measuring the initial color of coating drawdowns on Leneta paper and then measuring the color of the same drawdowns 28 days later. The films were stored at room temperature. As shown in Table 4, the color shift in dry film was mitigated using 1,2,4-triazole and sodium metabisulfite at higher concentrations.

TABLE 4

PPG DIAMOND Dry Film Color Changes in 28 Days at Ambient Temperature.

| Formulations | 1-A | 1-B | 1-C | 1-D | 1-E | 1-F | 1-G | 1-H | 1-I | 1-J | 1-K | 1-L | 1-M | 1-N | 1-O | 1-P |
|---|---|---|---|---|---|---|---|---|---|---|---|---|---|---|---|---|
| Delta E | 2.12 | 3.31 | 3.82 | 3.24 | 3.17 | 3.58 | 3.20 | 2.35 | 2.20 | 1.94 | 0.80 | 0.43 | 2.57 | 3.03 | 3.10 | 1.41 |

Example 2

Coating compositions were prepared according to the formulations shown in Table 5 using commercially available PPG DIAMOND brand paint. The glass particle comprising copper was added stepwise to PPG DIAMOND Eggshell under stirring with a conventional stirring blade for 5 minutes. The paints were stirred further for 10 minutes and then mixed on a shaker for 15 minutes. Citric acid or sodium citrate were then added as 10% and 15% solutions in water respectively under stirring, as indicated in Table 5.

TABLE 5

PPG DIAMOND Formulations with Citrate Generating Agents.

| | Formulations | | | | |
|---|---|---|---|---|---|
| Item | 2-A | 2-B | 2-C Amount (g) | 2-D | 2-E |
| PPG DIAMOND Eggshell | 99 | 99 | 99 | 99 | 99 |
| Copper containing glass[1] | 1 | 1 | 1 | 1 | 1 |
| Citric acid monohydrate[2], 10% in water | | 1 | 5 | | |
| Sodium citrate dihydrate[2], 15% in water | | | | 4.7 | 9.3 |
| Total Weight (g) | 100 | 101.0 | 105.0 | 104.7 | 109.3 |

TABLE 5-continued

PPG DIAMOND Formulations with Citrate Generating Agents.

| Item | 2-A | 2-B | 2-C | 2-D | 2-E |
| --- | --- | --- | --- | --- | --- |
| | Formulations Amount (g) | | | | |
| Total Solids (g) | 52.5 | 52.6 | 53.0 | 53.2 | 53.9 |
| % Copper containing glass particle[1] on total solids | 1.9 | 1.9 | 1.9 | 1.9 | 1.9 |
| % Agent on total solids | 0 | 0.2 | 0.9 | 1.3 | 2.6 |
| Ratio of copper containing glass particle[1] to agent | — | 10 | 2 | 1.4 | 0.7 |

[1]GUARDIANT particles from Corning
[2]Available from Sigma-Aldrich (St. Louis, MO)

The in-can color change of the coating compositions at ambient temperature was determined by measuring the initial color of the coatings one day after application via drawdown on Leneta paper and then measuring the color of a new drawdown after the coatings had aged in the cans for 28 days. The coatings were stored in lined cans at room temperature. As shown in Table 6, formulations 2-C, 2-D, and 2-E all demonstrated lower color shift (Delta E) over a period of 28 days as compared to control formulation 2-A, which contained no agent.

TABLE 6

PPG DIAMOND In-Can Color Changes in 28 Days at Ambient Temperature.

| | Formulations | | | | |
| --- | --- | --- | --- | --- | --- |
| | 2-A | 2-B | 2-C | 2-D | 2-E |
| Delta E | 1.51 | 1.68 | 0.76 | 1.06 | 1.06 |

The in-can color change of the coating compositions at elevated temperature was determined by measuring the initial color of the coating compositions one day after application via drawdown on Leneta paper and then measuring the color of a new drawdown after the coatings had aged in the cans for 28 days. The coatings were stored in lined cans at 140° F. for the duration of the 28 days. As shown in Table 7, all formulations demonstrated lower color shift (Delta E) over a period of 28 days as compared to control formulation 2-A, which contained no agent.

TABLE 7

PPG DIAMOND In-Can Color Changes in 28 Days at Elevated Temperature (140° F.).

| | Formulations | | | | |
| --- | --- | --- | --- | --- | --- |
| | 2-A | 2-B | 2-C | 2-D | 2-E |
| Delta E | 1.33 | 1.08 | 0.76 | 0.92 | 0.87 |

The dry film color change of the coating compositions was determined by measuring the initial color of coating drawdowns on Leneta paper and then measuring the color of the same drawdowns 28 days later. The films were stored at room temperature. As shown in Table 8, the color shift in dry films was mitigated using sodium citrate (2-D and 2-E) or higher concentrations of citric acid (2-C).

TABLE 8

PPG DIAMOND Dry Film Color Changes in 28 Days at Ambient Temperature.

| | Formulations | | | | |
| --- | --- | --- | --- | --- | --- |
| | 2-A | 2-B | 2-C | 2-D | 2-E |
| Delta E | 0.4 | 0.43 | 0.36 | 0.29 | 0.25 |

Example 3

Coating compositions were prepared according to the formulations shown in Table 9 using commercially available polyurethane PPG Refinish D8173 Premium UHS Clear coat. A set amount of D8173 base was transferred to an 8 oz. glass jar along with corresponding charges of copper containing glass particle and citric acid or stearic acid. Milling media at approximately half the weight of the component materials was added to the mixture. The jars were sealed with lids and placed on a Lau Dispersing Unit for 1 hour. This mixture of D8173 base, copper containing glass particle, and/or citric or stearic acid was the A-pack. After the dispersion process was complete, the A-packs were passed through 125 micron filters to remove the media. The D8302 hardener package was added and thoroughly mixed. Lastly, the Deltron thinner D871 was added and mixed prior to spray application.

TABLE 9

PPG Refinish D8173 Formulations.

| Formulations Item | 3-A | 3-B | 3-C | 3-D | 3-E | 3-F |
| --- | --- | --- | --- | --- | --- | --- |
| | Amount (g) | | | | | |
| D8173 Base | 40.2 | 40.2 | 40.2 | 40.2 | 40.2 | 40.2 |
| Copper containing glass particle[1] | | 1.08 | | 1.08 | | 1.08 |
| Citric acid monohydrate[2] | | | 0.126 | 0.126 | | |
| Stearic acid[2] | | | | | 0.425 | 0.425 |
| D8302 Hardener | 14.3 | 14.3 | 14.3 | 14.3 | 14.3 | 14.3 |
| D871 Thinner | 6.7 | 6.7 | 6.7 | 6.7 | 6.7 | 6.7 |
| Total Weight (g) | 61.2 | 62.3 | 61.4 | 62.5 | 61.7 | 62.8 |
| Total Solids (g) | 34.6 | 35.7 | 34.8 | 35.8 | 35.1 | 36.2 |
| % Copper containing glass particle[1] on total solids | 0 | 3.0 | 0 | 3.0 | 0 | 3.0 |
| % Agent on total solids | 0 | 0 | 0.4 | 0.4 | 1.2 | 1.2 |
| Ratio of copper containing glass particle[1] to agent | — | — | — | 8.6 | — | 2.5 |

[1]GUARDIANT particles from Corning
[2]Available from Sigma-Aldrich (St. Louis, MO)

The formulations in Table 9 were spray applied with an HVLP spray gun onto electrocoated steel panels that had been wet-sanded with 240 grit sand paper and primed with PPG Envirobase T400. The panels were purchased from ACT Test Panel Technologies, item #44049. The film thickness of the coatings ranged from 2.9 to 3.8 mils.

The initial color of the coating compositions 3-B, 3-D, and 3-F was measured two days after spray application. The in-can color change of the coating compositions at room temperature was determined by comparing the initial colors to those of samples sprayed 14 days later using the same A-packs that were originally sprayed. The A-packs were stored at room temperature between the two spray outs and the color was measured two days after application. As seen in Table 10, Delta E was improved for both 3-D and 3-F demonstrating that both citric acid and stearic acid mitigated in-can color changes after 14 days at ambient temperature.

TABLE 10

PPG Refinish D8173 In-Can Color Changes in 14 Days at Ambient Temperature.

| | Formulations | | |
|---|---|---|---|
| | 3-B | 3-D | 3-F |
| Delta E | 13.15 | 2.44 | 8.23 |

The steel test panels coated with formulations 3-A through 3-D were allowed to age under ambient conditions for a minimum of 7 days. Panels were cut to three 1.5×1.5-in. coupons for each formulation for testing in triplicate. The coupons were labeled on the back and sent to a third-party for testing antibacterial efficacy. Method JIS Z 2801 was followed for testing efficacy against *S. aureus* in which passing efficacy is demonstrated by log reduction>2. Results for coatings 3-A through 3-D are shown in Table 11. The combination of citric acid with copper containing glass particle (3-D) resulted in the highest efficacy of the tested coatings.

TABLE 11

Antimicrobial Efficacy of PPG Refinish D8173 Formulations.

| | Formulations | | | |
|---|---|---|---|---|
| | 3-A | 3-B | 3-C | 3-D |
| Log Reduction of *s. aureus* | 0 | 2.06 | 4.10 | 5.64 |

Example 4

Coating compositions were prepared according to the formulations shown in Table 12 using PITT-TECH PLUS EP Satin. The copper containing glass particle was added stepwise to PITT-TECH PLUS EP Satin under stirring with a conventional stirring blade for 5 minutes. The paints were stirred further for 10 minutes and then mixed on a shaker for 15 minutes. Citric acid, sodium citrate, or sodium benzoate were then added as 15% solutions in water respectively under stirring, as indicated.

TABLE 12

PITT-TECH PLUS EP Satin Formulations.

| Formulations Item | 4-A | 4-B | 4-C | 4-D | 4-E | 4-F |
|---|---|---|---|---|---|---|
| | Amount (g) | | | | | |
| PITT-TECH PLUS EP Satin | 99 | 99 | 99 | 99 | 99 | 99 |
| Copper containing glass particle[1] | 1 | 1 | 1 | 1 | 1 | 1 |
| Citric acid monohydrate[2], 15% in water | | 3.33 | | | | |
| Sodium citrate[2], 15% in water | | | 2.33 | 4.67 | 9.33 | |
| Sodium benzoate[2], 15% in water | | | | | | 2.29 |
| Total Weight (g) | 100.0 | 103.3 | 102.3 | 104.7 | 109.3 | 102.3 |
| Total Solids (g) | 52.1 | 52.6 | 52.4 | 52.8 | 53.5 | 52.4 |
| % Copper containing glass particle[1] on total solids | 1.9 | 1.9 | 1.9 | 1.9 | 1.9 | 1.9 |
| % Agent on total solids | 0.00 | 1.0 | 0.7 | 1.3 | 2.6 | 0.7 |
| Ratio of copper containing glass particle[1] to agent | — | 2 | 2.9 | 1.4 | 0.7 | 2.9 |

[1]GUARDIANT particles from Corning

[2]Available from Sigma-Aldrich (St. Louis, MO)

The in-can color change of the coating compositions was determined by measuring the initial color of the coating compositions one day after application via drawdown on Leneta paper and then measuring the color of a new drawdown after the coatings had aged in the cans for 28 days. The coatings were stored in lined cans at room temperature. As shown in Table 13, all formulations with added agent (4-B through 4-F) demonstrated lower color shift (Delta E) over a period of 28 days as compared to control formulation 4-A, which contained no agent.

TABLE 13

| PITT-TECH PLUS EP Satin In-Can Color Changes in 28 Days at Ambient Temperature. | | | | | | |
|---|---|---|---|---|---|---|
| Formulations | 4-A | 4-B | 4-C | 4-D | 4-E | 4-F |
| Delta E | 0.65 | 0.23 | 0.12 | 0.30 | 0.44 | 0.61 |

The dry film color change of the coating compositions was determined by measuring the initial color of drawdowns on Leneta paper and then measuring the color of the same drawdowns 28 days later. The films were stored at room temperature. As shown in Table 14, the color shift in dry film was mitigated using sodium citrate.

TABLE 14

| PITT-TECH PLUS EP Satin Dry Film Color Changes in 28 Days at Ambient Temperature. | | | | | | |
|---|---|---|---|---|---|---|
| Formulations | 4-A | 4-B | 4-C | 4-D | 4-E | 4-F |
| Delta E | 0.56 | 1.01 | 0.37 | 0.36 | 0.25 | 0.86 |

Example 5

For antimicrobial efficacy testing, coating compositions were prepared according to the formulations shown in Tables 15 and 16 using PITT-TECH PLUS EP Satin and Gloss coatings. A set amount of paint was transferred to an 8 oz. glass jar along with corresponding charges of copper containing glass particle, citric acid, sodium citrate, and/or sodium benzoate as indicated. Milling media at approximately half the weight of the component materials was added to the mixture. The jars were sealed with lids and placed on a Lau Dispersing Unit for 1 hour. After the dispersion process was complete, the paints were passed through 125 micron filters to remove the milling media. DI Water was added to thin the paints prior to spraying. Table 15 includes formulations using citric acid whereas Table 16 includes formulations with sodium salts.

TABLE 15

| PITT-TECH PLUS EP Satin and Gloss Formulations with Citric Acid. | | | | | | | | |
|---|---|---|---|---|---|---|---|---|
| Formulations | 5-A | 5-B | 5-C | 5-D | 5-E | 5-F | 5-G | 5-H |
| Item | Amount (g) | | | | | | | |
| PITT-TECH PLUS EP Satin | 125 | 125 | 125 | 125 | | | | |
| PITT-TECH PLUS EP Gloss | | | | | 125 | 125 | 125 | 125 |
| Copper containing glass particle[1] | | 2.3 | | 2.3 | | 2.3 | | 2.3 |
| Citric acid monohydrate[2] | | | 0.65 | 0.66 | | | 0.65 | 0.67 |
| DI Water | 12.5 | 19.2 | 19.1 | 27.1 | 12.5 | 19.2 | 19.1 | 27.1 |
| Total Weight (g) | 137.5 | 146.6 | 144.7 | 155.1 | 137.5 | 146.6 | 144.7 | 155.1 |
| Total Solids (g) | 64.5 | 66.8 | 65.2 | 67.5 | 63.8 | 66.1 | 64.4 | 66.7 |
| % Copper containing glass particle[1] on total solids | 0 | 3.5 | 0 | 3.4 | 0 | 3.5 | 0 | 3.5 |
| % Agent on total solids | 0 | 0 | 1.0 | 1.0 | 0 | 0 | 1.0 | 1.0 |
| Ratio of copper containing glass particle[1] to agent | — | — | 0 | 3.5 | — | — | 0 | 3.5 |

[1]GUARDIANT particles from Corning

[2]Available from Sigma-Aldrich (St. Louis, MO)

TABLE 16

PITT-TECH PLUS EP Satin and Gloss Formulations with Sodium Salts.

| Formulations | 5-I | 5-J | 5-K | 5-L | 5-M | 5-N | 5-O | 5-P | 5-Q | 5-R | 5-S | 5-T |
|---|---|---|---|---|---|---|---|---|---|---|---|---|
| Item | Amount (g) | | | | | | | | | | | |
| PITT-TECH PLUS EP Satin | 125 | 125 | 125 | 125 | 125 | 125 | | | | | | |
| PITT-TECH PLUS EP Gloss | | | | | | | 125 | 125 | 125 | 125 | 125 | 125 |
| Copper containing glass particle[1] | | | 2.3 | 2.3 | | 2.3 | | | 2.3 | 2.3 | | 2.3 |
| Sodium citrate dihydrate[2] | 0.45 | 0.91 | 0.46 | 0.93 | | | 0.45 | 0.91 | 0.46 | 0.93 | | |
| Sodium benzoate[2] | | | | | 0.45 | 0.46 | | | | | 0.45 | 0.46 |
| DI Water | 19.1 | 19.1 | 21.1 | 27.1 | 19.1 | 27.1 | 19.1 | 19.1 | 27.1 | 27.1 | 19.1 | 27.1 |
| Total Weight (g) | 144.5 | 145 | 148.9 | 155.4 | 144.5 | 154.9 | 144.5 | 145 | 154.9 | 155.4 | 144.5 | 154.9 |
| Total Solids (g) | 65 | 65.4 | 67.3 | 67.8 | 65 | 67.3 | 64.2 | 64.7 | 66.5 | 67 | 64.2 | 66.5 |
| % Copper containing glass particle[1] on total solids | 0 | 0 | 3.4 | 3.4 | 0 | 3.4 | 0 | 0 | 3.5 | 3.5 | 0 | 3.5 |
| % Agent on total solids | 0.7 | 1.4 | 0.7 | 1.4 | 0.7 | 0.7 | 0.7 | 1.4 | 0.7 | 1.4 | 0.7 | 0.7 |
| Ratio of copper containing glass particle[1] to agent | 0 | 0 | 5 | 2.5 | 0 | 5 | 0 | 0 | 5 | 2.5 | 0 | 5 |

[1]GUARDIANT particles from Corning
[2]Available from Sigma-Aldrich (St. Louis, MO)

The coatings of formulations 5-A through 5-T were spray applied with an HVLP spray gun onto electrocoated steel panels that had been wet-sanded with 240 grit sand paper. The film thickness of the coating examples ranged from 0.5 to 1.4 mils. The steel test panels coated with formulations were allowed to age under ambient conditions for a minimum of 7 days. Panels were cut to three 1.5×1.5-in. coupons for each formulation for testing in triplicate. The coupons were labeled on the back and sent to a third-party for testing antibacterial efficacy. Method JIS Z 2801 was followed for testing efficacy against *S. aureus* in which passing efficacy is demonstrated by log reduction>2. Results are shown in Table 17 for citric acid samples and Table 18 for sodium salt samples. Controls 5-A and 5-E were tested for antimicrobial activity at different times reflected 5A1/5E1, 5B1/5F1 (time 1) or 5A2/5E2, 5B2/5F2 (time 2).

TABLE 17

Antimicrobial Efficacy of PITT-TECH PLUS EP Satin and Gloss Formulations with Citric Acid.

| Formulations | 5-A1 | 5-B1 | 5-C | 5-D | 5-E1 | 5-F1 | 5-G | 5-H |
|---|---|---|---|---|---|---|---|---|
| Log Reduction of *s. aureus* | 0 | 1.99 | 0.2 | 5.7 | 0.2 | 0.7 | 0.3 | 3.2 |
| Log Reduction of *s. aureus* vs. control | 0 | 1.99 | 0.2 | 5.7 | 0 | 0.5 | 0.2 | 3.1 |

TABLE 18

Antimicrobial Efficacy of PITT-TECH PLUS EP Satin and Gloss Formulations with Sodium Salts.

| Formulations | 5-A2 | 5-B2 | 5-I | 5-J | 5-K | 5-L | 5-M | 5-N | 5-E2 | 5-F2 | 5-O | 5-P | 5-Q | 5-R | 5-S | 5-T |
|---|---|---|---|---|---|---|---|---|---|---|---|---|---|---|---|---|
| Log Reduction of *s. aureus* | 1.8 | 3.0 | 2.1 | 2.4 | 8.2 | 6.9 | 2.2 | 6.8 | 2.1 | 3.1 | 2.4 | 2.7 | 8.1 | 8.1 | 2.1 | 3.4 |
| Log Reduction of *s. aureus* vs. control | 0 | 1.1 | 0.3 | 0.6 | 6.3 | 5.1 | 0.4 | 5.0 | 0 | 1.0 | 0.3 | 0.6 | 6.0 | 6.0 | 0 | 1.3 |

As seen in Tables 17 and 18, passing antimicrobial efficacy of PITT-TECH PLUS EP formulations is not obtained with a copper containing glass particle or agents (citric acid, sodium citrate, or sodium benzoate) when added separately. However, antimicrobial efficacy is enhanced when copper containing glass particle is combined with citric acid, sodium citrate, or sodium benzoate. Differences in efficacy for 5A1/5B1/5E1/5F1 versus 5A2/5B2/5E2/5F2 are believed to be due variations in humidity and environmental conditions at the time of application.

What is claimed is:

1. A coating composition comprising a. A film forming component;

b. An effective amount of a copper containing glass particle; and c. An effective amount of a color shift mitigating agent; wherein the composition excludes thiourea and sodium thiocyanate.

2. The coating composition of claim 1, wherein the copper containing glass particle comprises 10 to 30 wt % copper, +/−3 wt %, with wt % based on the total weight of the particle.

3. The coating composition of claim 1, wherein the film forming component comprises a thermoset or thermoplastic resin, and optionally an acrylic emulsion, a vinyl acetate-ethylene copolymer emulsion, a vinyl acetate-acrylic copolymer emulsion, a styrene acrylic emulsion, a vinyl acetate-vinyl versatate copolymer emulsion, an epoxy resin, an acrylic resin, a polysiloxane resin, a polyurethane resin, a polyurea resin, a polyvinyl resin, a phenolic resin, a urea-formaldehyde resin, a polyimide resin, a melamine resin, a polyester resin, a cyanate resin, or any combination of any of these.

4. A coating composition comprising, a. A film forming component;

b. An effective amount of a copper containing glass particle; and c. An effective amount of a color shift mitigating agent; wherein the color shift mitigating agent comprises a sulfite generating compound; L-ascorbic acid; isoascorbic acid; substituted or unsubstituted triazole, substituted or unsubstituted benzotriazole; a benzoate generating compound; stearic acid; and/or a citrate generating compound.

5. The coating composition of claim 1, wherein the effective amount of copper containing glass particle is 40 grams per gallon of coating composition or greater.

6. The coating composition of claim 1, wherein the effective amount of copper containing glass particle comprising 26 wt %+/−3 wt % copper based on the weight of the particle is 0.90 to 4.0 wt % based on total solids of the composition.

7. The coating composition of claim 4, wherein the color shift mitigating agent comprises sodium bisulfite and/or sodium metabisulfite in an amount of 0.15 to 1.50 wt % based on total solids of the composition.

8. The coating composition of claim 4, wherein the color shift mitigating agent comprises citric acid in the form of citric acid monohydrate in an amount of 0.1 to 1.2 wt % and/or sodium citrate in an amount of 0.5 to 3.0 wt %, based on total solids of the composition.

9. The coating composition of claim 4, wherein the color shift mitigating agent comprises L-ascorbic acid in an amount of 0.1 to 1.0 wt % and/or iso-ascorbic acid in an amount of 0.1 to 1.5 wt %, based on total solids of the composition.

10. The coating composition of claim 4, wherein the color shift mitigating agent comprises 1,2,4-triazole, in an amount of 0.02 to 0.35 wt %, based on total solids of the composition.

11. The coating composition of claim 4, wherein the color shift mitigating agent comprises stearic acid in an amount of 0.5 to 1.5 wt %, based on total solids of the composition.

12. The coating composition of claim 4, wherein the color shift mitigating agent comprises sodium benzoate, in an amount of 0.5 to 1.0 wt %, based on total solids of the composition.

13. The coating composition of claim 1, wherein the ratio of copper containing glass particle to color shift mitigating agent is 40:1 to 0.5:1.

14. The coating composition of claim 1, wherein the composition comprises copper containing glass particle in an amount of 0.90 to 4.0 wt %, and color shift mitigating agent in a concentration of 0.02 to 3.0 wt %, with wt % based on total solids of the composition.

15. The coating composition of claim 1, wherein the color shift mitigating agent mitigates the color shift over time in the composition and/or coating layer deposited therefrom as compared to the same composition lacking such an agent and wherein the color shift is mitigated by 5% or greater based on the Delta E measurement.

16. The coating composition of claim 1, wherein the color shift mitigating agent contributes to the antimicrobial efficacy of the composition as compared to the same composition lacking such an agent and/or lacking copper containing glass particles and wherein the antimicrobial efficacy is enhanced at least by a 1 log reduction, with antimicrobial efficacy measure according to JIS Z 2801.

17. The coating composition of claim 1, further comprising a plasticizer, an abrasion-resistant particle, a film-strengthening particle, a flow control agent, a thixotropic agent, a rheology modifier, cellulose acetate butyrate, a catalyst, an antioxidant, a coalescing agent, an initiator, an accelerator, a reinforcing material, a defoamer, a surfactant, a wetting agent, a dispersing aid, a corrosion inhibitor, an adhesion promoter, clay, a hindered amine light stabilizer, a UV light absorber and/or stabilizer, a stabilizing agent, a filler, an organic cosolvent, a reactive diluent, a grind vehicle, and/or a colorant, including a pigment and/or dye, that may impart a desired color to the coating composition and a coalesced or cured coating layer deposited from such a composition, or any combination of any of these.

18. A coating composition comprising, a. A film forming component;

b. An effective amount of a copper containing glass particle; and c. An effective amount of a color shift mitigating agent; wherein the composition further comprises one or more of: dichloro-octylisothiazolinone fungicide/mildewcide, 3-iodo-2-propynyl butyl carbamate fungicide, zinc pyrithione, dibromodicyanobutane, hydrochloride, barium metaborate, 1,2-benzisothiazolin-3-one, a mixture of 5-chloro-2-methyl-2H-isothiazol-3-one/1,2-benzisothiazolin-3-one and/or 2-methyl-3-isothiazolone, 2-methyl-4-isothiazolin-3-one/1,2-benzisothiazolin-3-one biocide, 1,2-benzisothiazolin-3-one/2,2',2"-(hexahydro-1,3,5-triazine-1,3,5-triyl) triethanol, 2-bromo-2-nitro-1,3-propanediol, 2-bromo-2-nitro-1,3-propanediol/1,2-benzisothiazolin-3-one/2-methylisothiazolin-3-one, 2-bromo-2-nitro-1,3-propanediol/2-methylisothiazolin-3-one/5-chloro-2-methyl-2H-isothiazolin-3-one, N-(trichloromethylthio) phthalimide, chlorothalonil, 5-chloro-2-methyl-4-isothiazolin-3-one/2-methyl-4-isothiazolin-3-one, 2,2-dibromo-3-nitrilopropionamide, 3,4,4-trimethyl-oxazolidine/4,4-dimethyl-oxazolidine, methyl-4-isothiazolin-3-one, 2-octyl-2H-isothiazol-3-one, 1H,3H,5H-oxazolo[3,4-c]oxazole-7a (7H)-methanol/(1H,3H,5H-oxazolo[3,4-c]oxazol-7a (7H)-ylmethoxy)-methanol/5-hydroxypoly(methyleneoxy (75% C2, 21% C3, 4% C4, 1% C5)methyl-1-aza-3,7-dioxabicyclo-(3.3.0) octane, sodium pyrithione, and/or 2-(4-thiazolyl)benzimidazole.

19. The coating composition of claim 1, wherein the composition is aqueous based or solvent based and may be pigmented or clear, and if clear may be tinted or untinted.

20. The coating composition of claim 1, wherein the composition specifically excludes one or more of a non copper pyrithione salt, such as zinc pyrithione, TiO2,4- bromo-2-(4-chlorophenyl)-5-(trifluoromethyl)-1/H30-pyrrole-3-carbonitrile (tralopyril), a quaternary ammonium compound, and/or EDTA.

21. A substrate coated at least in part with the coating composition of claim 1.

22. The substrate of claim 21, wherein the substrate comprises a non-metallic substrate including concrete, stucco, cement board, medium density fiberboard, particle board, gypsum board, wood, stone, plastics including vinyl, textile, plaster, fiberglass, ceramic, and which may be smooth or textured.

23. The substrate of claim 21, wherein the substrate comprises a metallic substrate such as including ferrous metal, aluminum, aluminum alloys, coppery and any alloys thereof, iron, steel, and alloys thereof, cold rolled steel, galvanized (zinc coated) steel, electrogalvanized steel, stainless steel, pickled steel, zinc-iron alloy and/or combinations thereof.

24. The substrate of claim 21, wherein the substrate comprises or is a bare surface, a cleaned surface, pretreated with one or more pretreatment compositions, further prepared by sanding or other conventional preparation processes, and/or coated with one or more primary film-forming compositions such as electrocoats, water borne or solvent borne primers, surfacers, topcoats including pigmented basecoats, prior to application of the coating composition of claim 1.

25. The substrate of claim 21, wherein the substrate is part of a structure.

26. The substrate of claim 21, wherein the substrate is part of a vehicle.

27. The substrate of claim 21, wherein the substrate is used in an architectural application, including an interior wall, other interior surface, floor, carpet, cabinet, shelf, door handle or knob, door trim, banister, railing and/or light switch.

28. The substrate of claim 21, wherein the substrate is used in one or more of the automotive industry, the marine industry, an industrial substrate, heavy-duty equipment, a packaging substrate, furniture, fabric, apparel, electronics, housings for computers, notebooks, smartphones, tablets, televisions, gaming equipment, computer equipment, computer accessories, MP3 players, glass and transparencies, and sports equipment.

* * * * *